(12) United States Patent
McShane et al.

(10) Patent No.: US 6,184,459 B1
(45) Date of Patent: Feb. 6, 2001

(54) VEGETABLE OIL BASED DIELECTRIC COOLANT

(75) Inventors: Charles Patrick McShane; Jerry L. Corkran, both of Waukesha; Richard A. Harthun, Burlington; Gary A. Gauger, Franklin; Kevin J. Rapp, Oak Creek; Edgar Howells, Greendale, all of WI (US)

(73) Assignee: Cooper Industries Inc., Houston, TX (US)

( * ) Notice: Under 35 U.S.C. 154(b), the term of this patent shall be extended for 0 days.

(21) Appl. No.: 09/276,191

(22) Filed: Mar. 25, 1999

Related U.S. Application Data

(62) Division of application No. 08/728,261, filed on Oct. 8, 1996, now Pat. No. 6,037,537, and a division of application No. 08/576,372, filed on Dec. 21, 1995, now abandoned.

(51) Int. Cl.⁷ .................................................... H01F 27/08
(52) U.S. Cl. ........................ 174/17 LF; 336/94; 361/268
(58) Field of Search ......................... 174/17 LF, 17 GF, 174/25 C, 25 R, 50; 62/171; 361/268, 327, 274.2; 508/491; 336/94, 55, 58, 60; 252/673, 570

(56) References Cited

U.S. PATENT DOCUMENTS

| | | | |
|---|---|---|---|
| 1,935,595 | 11/1933 | Clark | 174/171 F |
| 2,440,930 | 5/1948 | Camilli et al. | 62/171 |
| 2,825,651 | 2/1958 | Loo et al. | 99/171 |
| 3,073,885 | 1/1963 | Camilli | 174/15 |
| 3,233,198 | 2/1966 | Schrader et al. | 336/94 |
| 3,626,080 | 12/1971 | Pierce | 174/15 |
| 3,740,685 * | 6/1973 | Fisher | 336/58 X |
| 3,772,624 | 11/1973 | Keogh | 336/55 |
| 3,902,146 | 8/1975 | Muralidharan | 336/57 |
| 4,019,996 | 4/1977 | Jay et al. | 252/63.7 |
| 4,053,941 | 10/1977 | Shimizu et al. | 361/319 |
| 4,085,395 | 4/1978 | Billerbeck et al. | 336/61 |
| 4,108,789 | 8/1978 | Jay et al. | 252/64 |
| 4,166,807 | 9/1979 | Komatsu et al. | 502/62 |

(List continued on next page.)

FOREIGN PATENT DOCUMENTS

| | | | |
|---|---|---|---|
| 22559/29 | 2/1930 | (GB) | 174/17 LF |
| 52-25298 | 2/1977 | (JP) | |
| WO 97/49100 | 12/1997 | (WO) | |

OTHER PUBLICATIONS

Clark, "Insulating Materials for Design and Engineering Practice," 1962, pp. 131, 132, 210–213, 216–218, 342, 344, 345, and 383.

"Contoured Transformer Unveiled," Transmission & Distribution, p. 42.

*Primary Examiner*—Kristine Kincaid
*Assistant Examiner*—Dhiru R Patel
(74) *Attorney, Agent, or Firm*—Fish & Richardson P.C.

(57) ABSTRACT

A transformer is disclosed, including a tank housing a transformer core/coil assembly, a dielectric insulating fluid surrounding the core/coil assembly, the fluid comprising a vegetable oil, an antioxidant dissolved in the oil, and a low temperature additive blended into the oil, wherein the fluid defines a headspace above the fluid. The preferred embodiment includes an oxygen absorbing material contained in the tank and in contact with gases in the tank but isolated from contact with the dielectric fluid, the tank including an opening and a sealed plug in the opening, such that the oxygen absorbing material can be replaced through the opening upon removal of the sealed plug, and further includes a gas permeable polymer container sealed against the opening for supporting the oxygen absorbing material and an indicator in gas contact with the headspace and visible from outside the tank for indicating the presence of oxygen in the headspace.

27 Claims, 1 Drawing Sheet

U.S. PATENT DOCUMENTS

| | | | |
|---|---|---|---|
| 4,177,156 | 12/1979 | Jay et al. | 252/66 |
| 4,187,327 | 2/1980 | Lapp et al. | 427/8 |
| 4,211,665 | 7/1980 | Pellegrini | 252/63 |
| 4,219,791 * | 8/1980 | Moore et al. | 336/58 |
| 4,238,343 | 12/1980 | Pellegrini | 585/24 |
| 4,259,708 | 3/1981 | Mandelcorn | 361/318 |
| 4,266,264 | 5/1981 | Mandelcorn et al. | 361/318 |
| 4,276,184 | 6/1981 | Mandelcorn et al. | 252/579 |
| 4,282,106 | 8/1981 | Schapp et al. | 252/32.7 |
| 4,290,926 | 9/1981 | Shaw | 252/579 |
| 4,320,034 | 3/1982 | Lapp et al. | 252/567 |
| 4,343,029 | 8/1982 | Renga et al. | 361/315 |
| 4,347,169 | 8/1982 | Sato et al. | 252/567 |
| 4,355,346 | 10/1982 | Gauger et al. | 361/318 |
| 4,384,972 | 5/1983 | Nakamura et al. | 252/188.21 |
| 4,413,674 | 11/1983 | Avery et al. | 165/104.33 |
| 4,427,561 | 1/1984 | Kusayanagi et al. | 252/45 |
| 4,437,082 | 3/1984 | Walsh et al. . | |
| 4,467,305 | 8/1984 | Ando | 336/55 |
| 4,493,943 | 1/1985 | Sato et al. | 174/25 |
| 4,511,949 | 4/1985 | Shedigian | 361/319 |
| 4,530,782 | 7/1985 | Meyer | 252/578 |
| 4,536,331 | 8/1985 | Shedigian | 252/579 |
| 4,543,207 | 9/1985 | Sato et al. | 252/570 |
| 4,549,034 | 10/1985 | Sato et al. | 17/17 |
| 4,566,994 | 1/1986 | Hasegawa et al. | 252/574 |
| 4,570,043 | 2/1986 | Lloyd et al. | 200/150 |
| 4,618,914 | 10/1986 | Sato et al. | 361/315 |
| 4,621,302 | 11/1986 | Sato et al. | 361/315 |
| 4,621,980 | 11/1986 | Reavely et al. | 416/226 |
| 4,623,953 | 11/1986 | Dakin | 361/315 |
| 4,627,192 | 12/1986 | Fick . | |
| 4,651,980 | 7/1987 | Sato et al. | 585/6.3 |
| 4,681,302 | 7/1987 | Thompson | 256/13.1 |
| 4,681,980 | 7/1987 | Sato et al. | 585/6.3 |
| 4,697,043 | 9/1987 | Rowe, Jr. | 174/17 |
| 4,702,966 | 10/1987 | Farrell et al. | 428/500 |
| 4,734,824 | 3/1988 | Sato et al. | 361/315 |
| 4,738,780 | 4/1988 | Atwood | 210/634 |
| 4,744,000 | 5/1988 | Mason et al. | 361/315 |
| 4,744,905 | 5/1988 | Atwood | 210/634 |
| 4,745,966 | 5/1988 | Avery | 165/104.33 |
| 4,747,447 | 5/1988 | Scanian et al. | 165/104.34 |
| 4,806,276 | 2/1989 | Maier . | |
| 4,828,703 | 5/1989 | Atwood | 210/634 |
| 4,834,257 | 5/1989 | Book et al. | 220/85 |
| 4,846,163 | 7/1989 | Bannister et al. | 128/124 |
| 4,929,784 | 5/1990 | Klinkmann et al. | 585/422 |
| 4,990,718 | 2/1991 | Pelrine | 585/455 |
| 5,077,069 | 12/1991 | Chang et al. | 426/330 |
| 5,102,659 | 4/1992 | Hudson | 424/195 |
| 5,143,763 | 9/1992 | Yamada et al. | 428/36.2 |
| 5,159,527 | 10/1992 | Flynn | 361/317 |
| 5,171,918 | 12/1992 | Shubkin et al. | 585/510 |
| 5,180,518 | 1/1993 | Sugihara et al. | 252/188.28 |
| 5,250,750 | 10/1993 | Shubkin et al. | 174/17 |
| 5,259,978 | 11/1993 | Yoshimura et al. | 252/79 |
| 5,260,077 | 11/1993 | Carrick et al. . | |
| 5,336,423 | 8/1994 | Pialet et al. | 165/104.34 |
| 5,429,761 | 7/1995 | Havelka et al. . | |
| 5,439,648 | 8/1995 | Balderson et al. | 422/86 |
| 5,451,334 | 9/1995 | Bongardt et al. | 252/56 R |
| 5,538,654 | 7/1996 | Lawate et al. . | |
| 5,571,492 | 11/1996 | Yao et al. | 423/263 |
| B1 4,627,192 | 10/1995 | Fick . | |

* cited by examiner

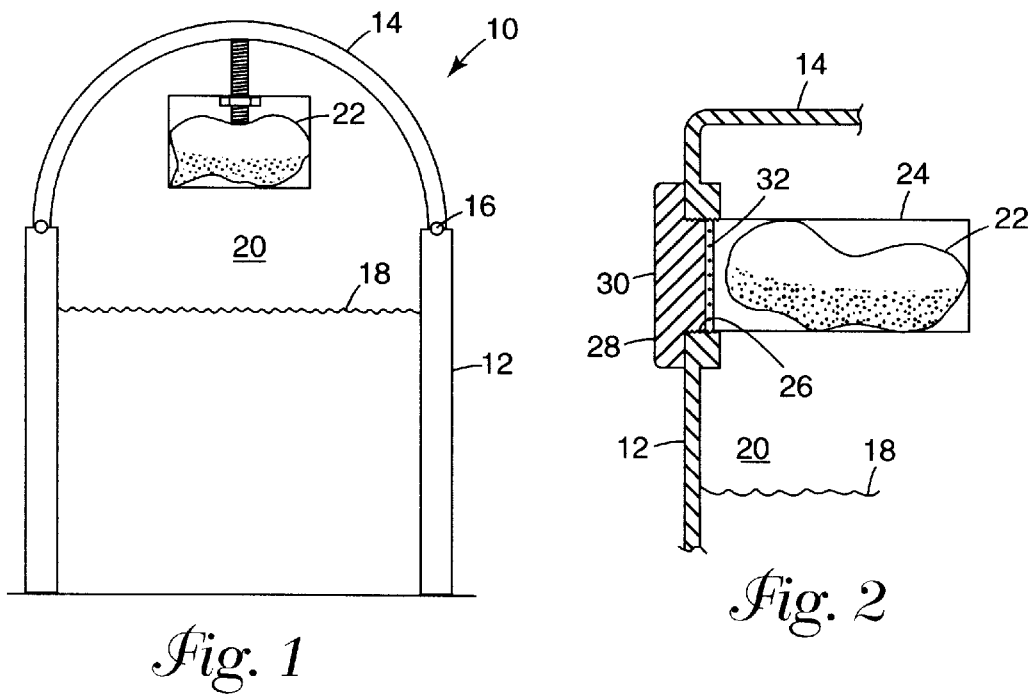
Fig. 1
Fig. 2
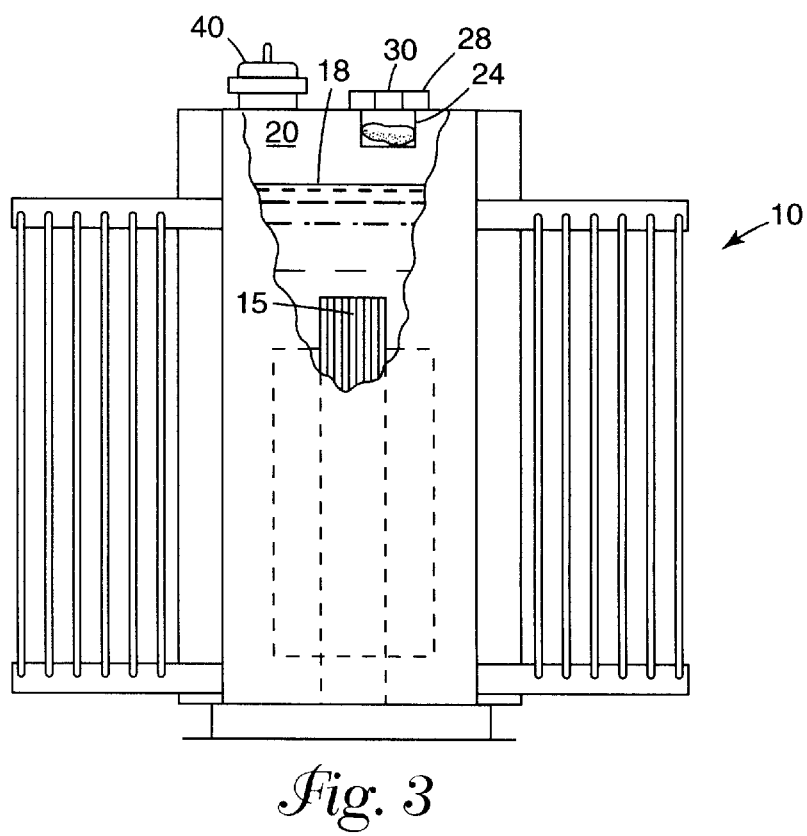
Fig. 3

VEGETABLE OIL BASED DIELECTRIC COOLANT

This is a divisional of U.S. application Ser. No. 08/728,261, filed Oct. 8, 1996, now U.S. Pat. No. 6,037,537 and Ser. No. 08/576,372, filed Dec. 21, 1995 (abandoned).

TECHNICAL FIELD OF THE INVENTION

The present invention relates generally to the field of dielectric coolants, or insulating oils, for use in electrical distribution and power equipment, including transformers. More particularly, the present invention relates to a vegetable oil based insulating liquid, and still more particularly, to a composition comprising one or more vegetable oils and at least one additive that increases the suitability of the vegetable oil for use as a dielectric coolant. The present invention also relates to modifications of equipment, such as transformer tanks, that can further enhance the suitability of the vegetable oil for use as a dielectric coolant.

BACKGROUND OF THE INVENTION

An insulating liquid for use in electrical distribution and power equipment, including transformers, has two important functions. First, it acts as an electrical insulating medium and, second, it transports heat generated in the equipment. For example, heat is transported from the windings and core of the transformer or connected circuits to cooling surfaces. In addition to possessing the dielectric strength and cooling capacity, the ideal insulating liquid should be environmentally compatible and relatively nonflammable.

For over a century, mineral oils derived from crude petroleum have been used extensively as insulating and cooling liquids in electrical equipment. However, as safety standards became more demanding for many indoor and vault equipment installations, such oils were replaced to a great extent by non-flammable liquids, such as askarel (polychlorinated biphenyl-PCB) fluids. Beginning in the 1930's, PCB's, which are generally considered to be nonflammable, were widely utilized as replacements for mineral oils as insulating liquids in electrical equipment. Nonflammability is a required property for insulating oils that are used in equipment placed within or around building structures, as it is necessary to minimize the hazard of fire and explosion damage in the event of electrical faults within the equipment.

Eventually, it became recognized that PCB's are environmentally hazardous liquids. As a result, the production and sale of PCB's and their use in new equipment was banned. For existing PCB-containing equipment, severe regulations were issued requiring PCB removal at certain installations and severe restrictions for all other installations. In addition, spill reporting, clean-up and disposal require compliance with very strict regulations outlined in U.S. EPA rules published in various editions of the Federal Register. Furthermore, due to their relatively poor ability to suppress arcs and harmful arc-degradation by-products, PCB-based fluids were not applied to immersed safety and operational devices such as submerged power fuses, circuit breakers, and load-break switches.

Because of the disadvantages and shortcomings of the polychlorinated biphenyls, there have been numerous efforts made to develop relatively inexpensive, environmentally safe, nonflammable insulating oils. To date these efforts have not been completely successful. It is the general object of the present invention to provide electrical equipment utilizing an insulating liquid that is non-toxic, biodegradable, relatively nonflammable, innocuous to the environment, and comparatively inexpensive. In addition, the insulating oils typically conform to existing specifications or guides for dielectric fluids and must exhibit performance characteristics that are generally comparable to presently used insulating oils.

Some of the functional properties of the oil and their significance are as follows. An oil's dielectric breakdown at 60 Hertz indicates its ability to resist electrical breakdown at power frequency and is measured as the minimum voltage required to cause arcing between two electrodes submerged in the oil. The impulse dielectric breakdown voltage indicates its ability to resist electrical breakdown under transient voltage stresses such as lightning and power surges. The dissipation factor of an oil is a measure of the dielectric losses in that oil. A low dissipation factor indicates low dielectric losses and a low concentration of soluble, polar contaminants. The gassing tendency of an oil measures its tendency to evolve or absorb gas under conditions where partial discharge is present.

Because one function of the dielectric fluid is to carry heat, factors that significantly affect the relative ability of the fluid to function as a dielectric coolant are viscosity, specific heat, thermal conductivity, and coefficient of expansion. The values of these properties, particularly in the range of operating temperatures for the equipment at full rating, are weighed in the selection of suitable dielectric fluids.

In addition to all of the foregoing properties that affect heat transfer, a dielectric fluid for commercial use should have a relatively high dielectric strength, low dissipation factor, a dielectric constant compatible with the solid dielectric, a low gassing tendency, and must be compatible with typical electrical equipment materials that are exposed to it. In order to function properly, the material must have an adequate heat transfer capability, which depends on its viscosity, specific heat and coefficient of expansion.

Current codes and standards further require that any dielectric fluid intended for use as a coolant must not be classified as Flammable, but rather as a Class IIIB Combustible liquid. The safety requirements depend on the application in which the electrical equipment containing the fluid will be used, such as indoor, rooftop, vault, and adjacent to building installations. According to the degree of hazard, one or more safeguards may be required. One recognized safeguard option is the substitution of conventional mineral oil with Less-flammable and Non-flammable liquids. Less-flammable liquids must have an open-cup fire point equal or greater than 300° C.

As described above, several operable fluids are known and used in electrical equipment. However, due to increasing awareness and sensitivity regarding environmental concerns, it has become desirable to provide a dielectric fluid that has minimal effect on the environment and degrades quickly and easily enough so that spills will not contaminate the soil or the water table for any significant period of time, nor represent a significant hazard prior to the natural biodegradation process. It is becoming more desirable to replace non-renewable resources with renewable resources, particularly in the area of petroleum based products. There is increased demand by purchasers for all-natural products. Finally, more attention is being placed on the long-term effects of materials and their degradation by-products. All these environmental, health, and safety trends favor the use of vegetable based dielectric coolants over those derived from petroleum.

The oils derived from various plants, herein referred to as "vegetable oils," include man oils that have suitable dielectric properties when the oil is fresh and carefully processed. It is often the case, however, that such oils are particularly susceptible to polymerization when exposed to free oxygen. The rate of polymerization is directly related to the temperature of the oils at the time of exposure to free oxygen. Exposure to oxygen activates unsaturated bonds, causing oxidative polymerization of the oil, with potentially adverse effects on both equipment in the fluid and on the properties of the fluid itself.

Many types of electrical power distribution equipment, including transformers, are low-maintenance equipment that may go many years without inspection. The presently used mineral oils are significantly less susceptible to degradation due to exposure to oxygen than vegetable oils and therefore typically pass the standard oxidation stability tests. Therefore, mineral oils are well suited to use in this type of electrical equipment due to their long operable life. Correspondingly, until now there has been no acceptable way to effectively reduce the long-term effects of exposure of vegetable oils to oxygen, so vegetable oils have not been successfully used as dielectric coolants in modern electrical equipment. It is therefore desired to provide a low maintenance vegetable oil based dielectric coolant that meets or exceeds safety standards and is environmentally innocuous.

These and other objects and advantages of the invention will appear from the following description.

SUMMARY OF THE INVENTION

The present invention includes an insulating coolant composition based on one or more vegetable oils and including various additives that increase the functional properties of the oil. The present composition preferably has low viscosity, high dielectric strength, and a high fire point and includes a low temperature additive, an antioxidant, and an antimicrobial agent. The composition is selected to be stable over long periods of use in electrical distribution and power equipment, and transformers in particular. Because the present composition is essentially a natural food product, it poses no environmental or health safety hazard.

The present invention further comprises an oxygen scavenging device for removing oxygen from the headspace of the electrical equipment. The oxygen scavenging device is preferably an amount of an oxygen absorbing compound, such as iron oxide, that is enclosed in a container that prevents the oxygen absorbing compound from directly contacting the dielectric coolant. The container is preferably constructed of a gas permeable, moisture/liquid impermeable material, so that any oxygen that may be present in the tank headspace will ultimately pass through it and be absorbed inside the container.

The present invention further includes means for reducing the leakage of oxygen-containing air into the equipment housing. These means include modifications to the tank itself and gaskets used in sealing the tank.

BRIEF DESCRIPTION OF THE DRAWINGS

FIG. 1 is a schematic, cutaway side view of a transformer tank of the present invention;

FIG. 2 is a schematic, cutaway side view of a housing in the transformer tank for an oxygen scavenging material; and FIG. 3 is a cutaway side view of the transformer with the tank and housing of FIGS. 1 and 2.

DETAILED DESCRIPTION OF THE INVENTION

The present invention allows the use of vegetable based oils as dielectric fluids in electrical distribution and power equipment, including transformers. Vegetable oils typically comprise mixed glycerides formed from the combination of a polyol such as glycerin having a number of hydroxyl groups that have been esterified with an equal number of fatty acid molecules. Many vegetable oils are triglycerides, i.e. have three fatty acids chemically bonded to the glycerin. The generalized formula for a triglyceride is:

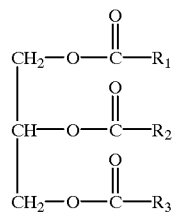

where $R_1$, $R_2$, $R_3$ may be the same or different with carbon chains from $C_4$ to $C_{22}$ and levels of unsaturation from 0 to 3.

Differences in vegetable oils are caused by variations in the fatty acid molecules. There are several different fatty acids, including myristic, palmitic, stearic, oleic, linoleic, linolenic, arachidic, eicosenoic, behenic, erucic, palmitiolic, docosadienoic, lignoseric, tetracosenoic, margaric, margaroleic, gadoleic, caprylic, capric, lauric, pentadecanoic and hepadecanoic acids. The fatty acids are resulting vegetable oils can vary in their degree of saturation. The three fatty acids on a triglyceride molecule may be all the same or may comprise two or three different fatty acids. While triglyceride composition varies from species to species, and less so from strain to strain of a particular species, vegetable oil derived from a single strain will have essentially the same fatty acid composition.

Every naturally occurring triglyceride has unique properties. For example, some of the triglycerides are more susceptible to oxidation than others. According to the present invention, it is preferred to use oils having fatty acids that include at least one degree of unsaturation (at least one C=C double bond). This mitigates the effects of oxidation and helps reduce the evolution of hydrogen gas that might otherwise occur. It has been found that oils containing mono-unsaturates oxidize less readily than other oils and are therefore somewhat preferred for use in the present application. Suitable vegetable oils include: soya, sunflower, rapeseed (canola), cottonseed, olive, safflower, jojoba, lesquerella, and veronia. All have fire points above 300° C.

Oxidation Avoidance

When the triglycerides of which vegetable oils are comprised are exposed to oxygen, they react to activate unsaturated bonds, causing oxidatve polymerization of the oil. Products of such a reaction are undesirable because they have chemical properties that are inferior to the original vegetable oil. It has been found that long-term degradation of the oil's properties due to oxidation requires long-term exposure to oxygen. Thus, for example, even if an oil is saturated with oxygen prior to testing, it can survive accelerated life testing without adverse effects if it is prevented from contacting additional oxygen during the test.

Therefore, it is desirable to provide a means for reducing the exposure of the oil to oxygen. By eliminating oxygen in the headspace of the electrical equipment and minimizing the amount of oxygen initially dissolved in the vegetable oil, the rate of the oxidation reaction may be greatly reduced as described below. However, due to the prolonged operational life expectancy of some electrical equipment, which is typically in excess of twenty years, it is desirable to provide further means for reducing the overall reaction rate. According to the present invention, this is accomplished in part by dissolving an oxygen scavenging chemical in the vegetable oil. Examples of suitable antioxidants include BHA (butylated hydroanisole), BHT (butylated hydrotoluene), TBHQ (tertiary butylhydroquinone), THBP, (Tetra Hydro Butro Phenone), ascobyl palmitate (rosemary oil), propyl gallate and alpha-, beta- or delta-tocopherol (vitamin E). Other suitable antioxidants will be known to those skilled in the art.

Low Temperature Additives

Another factor critical to the performance of dielectric coolants are their low temperature physical properties, including pour point values. Typically, vegetable oils do not have natural pour points low enough to be suitable for standard electrical power distribution applications. An average electrical power distribution application will require a coolant having a pour point below −20° C. According to the present invention, the vegetable oil-based coolant is modified so as to ensure that it will remain a flowable liquid even when the equipment is subjected to moderate low temperatures (lower than −20° C.) during its off-cycle. Modification of the oil includes the addition of a pour point depressant from the group including polyvinyl acetate oligomers and polymers and/or acrylic oligomers and polymers.

It has further been found that certain blends of oils have a lower pour point than either of the component oils have alone. For example, it has been found that blend of 25 percent soya oil (I) with 75 percent rapeseed oil (II) has a pour point of −24° C., as compared with −15° C. and −16° C. for (I) and (II) respectively. Some other combinations that exhibit similarly advantageous reductions in pour point include: 25% soybean oil+75% oleate modified oil, 50% soybean oil+50% oleate modified oil, 25% soybean oil+75% sunflower oil. The addition of 0.1% to 0.3% sorbitan tristearate will also reduce the pour point of the oil. It will be understood that the list of combinations set out herein is not exhaustive, but is intended to be illustrative of the nature of the invention.

It has further been found that vegetable oils exhibit a low temperature behavior that is different from that of mineral oils. Specifically, if a vegetable oil is cooled to a low temperature that is slightly above its pour point temperature, so that it is still pourable, it may become solid or gelled upon prolonged storage at that temperature. It has also been found that the low temperature stability of the oil can be improved by the addition of one or more pour point depressant additives, and by the blending of two or more oils, as described above.

Antimicrobial Additives

It is further preferred to include in the vegetable oil a compound to inhibit the growth of microorganisms. Any suitable antimicrobial substance that is compatible with vegetable oil may be used. For example, it is known that phenolic antioxidants such as BHA have some activity against bacteria, molds, viruses and protozoa, particularly when used with other antimicrobial substances such as potassium sorbate, sorbic acid or monoglycerides. Vitamin E, ascorbyl-6-decanoate and other known compounds are also suitable for use as antimicrobial agents in the oil.

Water Removal

Because of its negative effect on dielectric performance, the presence of water, a polar contaminant, in the fluid is undesirable. Water in the fluid will increase the rate of breakdown of fatty acid esters in the vegetable oil base in proportion to the amount of water available for the reaction. The most obvious indicator of such reactions is a significant increase in the value of the neutralization number due to the increased acidity of the fluid. This reaction will lead to the formation of polar contaminants (ASTM D974).

The problem is compounded by the wide temperature range over which electrical distribution equipment must operate. It is known that the dielectric breakdown characteristics and other dielectric properties of mineral oils are directly related to the percent of saturation of water present in the oil. As the saturation point is reached, dielectric strength falls rapidly. The saturation point at room temperature for typical mineral oils used for dielectric coolants is approximately 65 ppm at room temperature, and over 500 ppm at nominal operating temperature, approx. 100° C. However, electrical distribution equipment is typically required to be able to operate over a wide temperature range, resulting in constant increases and decreases in the water content temperature necessary to achieve saturation. Water that is dissolved or in vapor/liquid equilibrium at a high operating temperature may precipaitate or condense when the oil is brought to a lower temperature.

Standards typically require moisture removal from conventional mineral oils to below 35 ppm for use in new distribution equipment. The moisture removal process uses either evaporation in a reduced pressure chamber, filtration, or both to a typical level of 15–25% saturation at room temperature (10–15 ppm) prior to filling the distribution equipment.

Vegetable oils, in contrast, have a much higher water saturation points, typically well over 500 ppm at room temperature. Therefore, acceptable moisture levels for use in new distribution equipment can be much higher than that of conventional oils in terms of parts per million. However, due to the additional negative influence of water in vegetable oil causing fatty acid ester breakdown, the moisture removal process should strive for moisture levels as a percent of saturation well below the desired values of mineral oil. Five to 10% of the saturation level is the recommended range for vegetable oil at the end of the moisture removal process.

Solids Removal

It has also been found preferable to remove various waxy particulates and other minute solid contaminants from the oil by means of filtration. An example of suitable filtration means is a filtration medium capable of removing particulate matter as small as five (5) microns.

Processing

Each vegetable base oil will be processed to remove excessive moisture to a level of less than ten percent (10%) of the saturation level, and to remove particulates, and other contaminants, in similar manner to the current practice of treating conventional mineral dielectric base oils. The treated base oils are then blended to achieve the desired compositions. To these blends, additives are added to improve certain key properties of the compound, including antioxidant(s), antimicrobial-agent(s), and pour point depressant(s). Once the materials have been uniformly blended, the product is preferably stored in sealed systems or containers for future use.

Equipment Filling

The dielectric coolant must be properly introduced into the electrical equipment tank. The preferred process for tank filling minimizes the exposure of the coolant to atmospheric oxygen, moisture, and other contaminants that could adversely affect its key properties. The preferred filling process includes drying of the tank contents, evacuation and substitution of air with dry nitrogen gas, filling under partial vacuum, and immediate sealing of the tank. If the electrical device requires a headspace between the dielectric fluid and the tank cover, after filling and sealing the tank, the gas in the headspace should be evacuated and substituted with an inert gas, such as dry nitrogen, with a stable positive pressure of between 2 and 3 psig at 25° C.

Properties of the Present Oil

It has been found that most vegetable oils have an open-cup fire point well above the accepted minimum standard (300° C.) for both conventional dielectric oil and less-flammable fluids. For example, soya oils typically have fire points of approximately 350° C. According to the present invention, the prefered oils have viscosities between 2 and 15 cSt at 100° C. and less than 110 cSt at 40° C. and heat capacities (specific heats) greater than 0.3 cal./gm/°C.

Long term stability is enhanced by selection of most favorable vegetable oil blends, processing, and the addition of antioxidant and antimicrobial agents. Stability is further enhanced by controlling the environment to which the composition is exposed, particularly, minimizing oxygen, moisture and contaminant ingress into the tank, and by providing means for removing or capturing oxygen that might leak into the tank.

Low temperature properties are improved by using optimal vegetable oil blends and by using pour point depressant additives. Together, these methods can result in pour points below −20° C. which is low enough for most standard electrical equipment applications.

Elimination of Oxygen in the Tank Headspace

It is also desirable to eliminate oxygen that may be present in the headspace of electrical equipment containing a vegetable oil based dielectric fluid. There are different approaches to electrical equipment design. One design that is not suitable for use of vegetable based insulating coolants is the conservator non-sealed-type.

More common in ANSI/IEEE standard electrical distribution and medium power equipment design is the use of a tank headspace to allow for expansion and contraction of the tank contents. Even if the headspace of the equipment is purged of air and replaced with inert gases, it is possible over the operating life for oxygen (air) to leak into the headspace due to openings of the cover or accessories, slow migration through gaskets, and operation of the pressure relief device. Ingress of oxygen into the headspace will eventually contribute to the consumption of the antioxidant additives in the fluid. Hence, it is desirable to eliminate oxygen that may leak into the headspace of the tank.

One method for reducing the ingress of oxygen is to weld any components, covers or access points that communicate with the headspace, as gaskets and other means for sealing such openings are all susceptible to leakage over time.

This can e accomplished by providing a dry oxygen scavenging compound in the headspace. In order prevent contact between the oxygen scavenging compound and the vegetable oil, it is preferred to contain such compound in an oxygen-permeable, oil- and moisture-impermeable polymer container. Examples of suitable containers include those made of polyolefins including high density polyethylene, polypropylene, polybutylene, or polymethylpentene, and co-polymers thereof. The selected material must sufficiently permeable to oxygen and must be able to maintain the desired charactersitcs both at the high operating temperatures and in the broad range of temperatures to which the tank is exposed. A preferred material is a polymer film, which can be made into a pouch for containing the oxygen scavenging compound.

A preferred oxygen scavenging compound is sold under the name Ageless by the Cryovac Division of W. R. Grace & Company, Duncan, S.C. 29334. The primary constituent of Ageless is iron oxide. Alternatively, the oxygen absorbing agent may comprise a mixture of ferrous salts with an oxidation modifier and/or metallic sulfites and sulfates compounds. These compounds react with oxygen according to the following formulas:

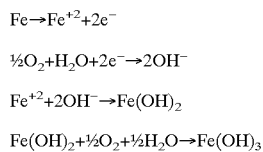

In the above reaction, water is also reacted, which is advantageous in the present application, as water is a polar contaminate that can adversely affect the dielectric properties of the oil.

Alternatively, an oxygen removing compound can be provided according to the teachings of U.S. Pat. No. 2,825,651, which discloses an oxygen remover comprising an intermixing of a sulfite salt with an accelerator such as hydrated copper sulfate, stannous chloride, or cobaltous oxide. A second alternative oxygen scavenging compound is disclosed in U.S. Pat. No. 4,384,972, which teaches the use of a salt of manganese, iron, cobalt or nickel, an alkali compound and a sulfite or a deliquescent substance.

Examples of other compounds that can be used to scavenge oxygen from the headspace include: a combination of carbon and activated iron powder, mixtures of hydrosulfite, calcium hydroxide, sodium bicarbonate and activated carbon, a metal halide powder coated on the surface of a metal powder, and combinations of an alkali compound such as calcium hydroxide with sodium carbonate or sodium bicarbonate.

The following description is given in terms of an electrical transformer. It will be understood by those skilled in the art that the compositions and method set forth are equally suited to use in other types of electrical equipment, including, but not limited to: reactors, transformers, switchgear, regulators, tap changer compartments, high voltage bushings, etc.

Referring now to FIG. 1, a transformer tank 10 typically comprises a tank body 12, a tank cover 14 bolted or welded to tank body 12 and sealed with a gasket 16. Tank body 12 is sealed. Tank 10 houses the transformer core and windings (not shown) in FIG. 1 or other electrical equipment, which are immersed in a dielectric insulating fluid 18. The space between the surface of the fluid and the tank cover is the tank headspace 20. According to one embodiment of the present invention, a polymer container 22 containing oxygen scavenging material is mounted in the headspace of the tank, preferably on the inside of the tank cover as shown in FIG. 1. A set forth above, container 22 is preferably a pouch or bag constructed of gas-permeable film. According to a more preferred embodiment shown in FIG. 2, the container 22 is supported in a polyolefin housing 24 mounted adjacent to a threaded opening 26 in the tank cover. A threaded plug 28 seals the container in the opening in the tank cover 14 and preferably includes a transparent viewing port 30. It will be understood that view port 30 can alternatively be incorporated into another part of the tank cover or walls.

When it is desired or necessary to replace the container of oxygen scavenging material, the threaded plug 28 is removed, and the container 22 is removed from the polyolefin housing 24 and replaced. The low gas permeability of housing 24 prevents significant gas exchange between the headspace 20 and the outside atmosphere during the short period that the threaded plug is removed. This can be accomplished even though the gas permeability of the container is not so high as to impede operation of the oxygen scavenging material over more extended periods of time.

Still referring to FIG. 2, in addition to the oxygen scavenging material, it is preferred to provide a means for indicating the presence of oxygen in the tank headspace. This indicator is preferably an oxygen sensitive compound 32 such as that marketed by the Mitsubishi Gas Chemical Company and distributed in the United States by the Cryovac Division of W. R. Grace and Company under the trade name Ageless Eye. This compound exhibits a pink-to-blue color change when the ambient oxygen concentration exceeds 0.1%.

The oxygen indicator is preferably housed in the tank headspace wall in such a manner that it can both chemically contact the gas in the headspace and be visible for inspection from outside the tank. One way to accomplish this is to mount the oxygen indicator adjacent to the view port 30 as shown.

Tank Modifications

In addition to the foregoing, the use of vegetable oil based dielectric insulating fluids in transformers is facilitated by several modifications to the transformer tank. These include providing the sealed, accessible chamber described above, in which the oxygen absorbing material can be replaced without increasing the exposure of oil in the tank to air. Other modifications reduce the leakage of air into the tank, so as to reduce the long-term exposure of the oil to air.

Referring now to FIG. 3, a transformer tank 10 is shown that includes a transformer core and windings 15 immersed in a dielectric insulating fluid 18. To reduce the leakage of air into the tank, one such modification relates to the volume of the tank headspace 20. For example, current ANSI/IEEE C57 series standards require distribution transformer tanks to remain sealed over a temperature range of from −5° C. to +105° C. for pole and padmounted designs and from −20° C. to +105° C. for substation transformers. Outside this range the tank is typically vented to avoid damage to the tank or related equipment. According to the present invention, the head space volume is increased so that the temperature range over which the tank remains sealed increases correspondingly, thus reducing the probability of oxygen (air) leaking into the tank. Specifically, the present tank preferably includes a head space volume sufficient to allow the tank to remain sealed from −20° C. to +115° C.

In addition, each tank includes an automatic pressure release device (PRD) 40 for venting the tank as described above. According to the present invention, the PRD 40 is calibrated to automatically vent head gas space only when the internal pressure exceeds 9±1 psig, and to automatically reseal when the pressure reduces to 6±1 psig. Because the PRD reseals at a positive pressure, the head space will maintain a positive pressure even after venting by the PRD. Maintaining a positive pressure in the head space helps prevent the ingress of air into the tank.

In addition to the foregoing, it is also preferred to replace the conventional gaskets (not shown) with gaskets made from a material that is substantially gas impermeable. It will be understood that such gasket material must also be resistant to degradation by the dielectric coolant. Examples of a suitable gasket material include nitrile rubber with a high acrylonitrile content, and various fluoroelastomers, of which the compound sold under the name VITON, a trademark of the E. I. duPont de Nemours & Company, is representative. In contrast, silicone rubber, and nitrile rubber having a low acrylonitrile content are believed to be less suitable, due to relatively high gas permeability. It will be understood that this list is illustrative only, and that other resilient, gas impermeable materials could be used to form the gaskets for the transformer tank. As mentioned above, another way to avoid the leakage associate with the long-term use of gaskets, is to weld the equipment housing shut, completely eliminating the gasketed seals.

Another method of reducing gas ingress is to eliminate the head space by providing for thermal expansion by other means. The pressure/partial vacuum withstand would be based on a thermal range of the average fluid temperature of −20 through 115° C.

For units with sufficient headspace, vegetable oil based dielectric coolants could also serve as an excellent material in the recent development of High Temperature Transformers, which typically have a maximum top oil rated temperature rise over ambient of 115° C.

Internal Insulation Modification

In another to the foregoing, vegetable oil based dielectric insulating fluids in electrical equipment in which paper insulation has been substituted by non-cellulose insulating "paper" would have greater inherent stability. This is due to the fact that cellulose materials liberate water as they are thermally degraded. Candidate materials include aramid insulating material, polyester materials, polamid, etc.

While a preferred embodiment of the invention has been shown and described, modifications thereof can be made by one skilled in the art without departing from the spirit of the invention.

What is claimed is:

1. A transformer including a tank housing a transformer core/coil assembly, comprising:

a dielectric insulating fluid surrounding said core/coil assembly, wherein said dielectric insulating fluid is essentially a natural food product and consists essentially of a vegetable oil and an oxygen scavenging chemical, and wherein the vegetable oil has a viscosity of between 2 and 15 cSt at 100° C., and less than 110 cSt at 40° C.; and an oxygen absorbing material contained in said tank and in contact with gases in said tank but isolated from contact with said dielectric insulating fluid.

2. A transformer including a tank housing a transformer core/coil assembly, comprising:

a dielectric insulating fluid surrounding said core/coil assembly, wherein the dielectric insulating fluid is essentially a natural food product and consists essentially of:

a vegetable oil and an oxygen scavenging chemical, wherein the vegetable oil has a viscosity of between 2 and 15 cSt at 100° C., and less than 110 cSt at 40° C., and a low temperature additive, and an oxygen absorbing material contained in said tank and in contact with gases in a headspace above said dielectric insulating fluid but isolated from contact with said dielectric fluid.

3. The transformer according to claim 2, wherein said oxygen absorbing material comprises iron oxide.

4. The transformer according to claim 2, wherein said oxygen absorbing material is housed in a gas permeable, liquid impermeable container.

5. The transformer according to claim 4, wherein said container is a pouch constructed of polymer film.

6. The transformer according to claim 2, further including an opening in the tank and a sealed plug in said opening, such that said oxygen absorbing material can be replaced through said opening.

7. The transformer according to claim 6, further including a view port for viewing said oxygen absorbing material.

8. The transformer according to claim 7 wherein said view port is incorporated in said sealed plug.

9. The transformer according to claim 6, further including a polyolefin container sealed against said opening for supporting said oxygen absorbing material such that when said plug is removed said sealed oxygen absorbing material can be replaced without significant gas exchange between said headspace and the atmosphere.

10. The transformer according to claim 6, further comprising an indicator in gas contact with said headspace for indicating the presence of oxygen in said headspace.

11. The transformer according to claim 10, wherein said indicator undergoes a visible color change upon exposure to a predetermined level of oxygen.

12. The transformer according to claim 10, wherein said indicator is mounted in said headspace so as to be visible from outside the tank without opening the tank.

13. The transformer according to claim 2, wherein said oxygen absorbing material comprises a combination of a sulfite salt with an accelerator selected from the group consisting of hydrated copper sulfate, stannous chloride and cobaltous chloride.

14. The transformer according to claim 2, wherein said oxygen absorbing material comprises a combination of carbon and activated iron powder.

15. The transformer according to claim 2, wherein said oxygen absorbing material comprises hydrosulfite, calcium hydroxide, sodium bicarbonate and activated carbon.

16. The transformer according to claim 2, wherein said oxygen absorbing material is selected from the group consisting of a metal halide powder coated in the surface of a metal powder; and a combination of an alkali compound with a sodium carbonate.

17. The transformer according to claim 2, wherein said core/coil assembly is further insulated with layers of a non-cellulosic insulating material.

18. A transformer including a tank housing a transformer core/coil assembly, comprising:

a dielectric insulating fluid surrounding said core/coil assembly, wherein said sealed fluid is essentially a natural food product and consists essentially of:
 a vegetable oil with a viscosity of between 2 and 15 cSt at 100° C., and less than 110 cSt at 40° C.,
 an oxygen scavenging chemical, and
 a low temperature additive, and
 an oxygen absorbing material contained in said tank and in contact with gases in a headspace above the dielectric fluid but isolated from contact with said dielectric fluid.

19. A method of using a transformer comprising the step of employing in the transformer a dielectric fluid that is essentially a natural food product, the dielectric fluid consisting essentially of a vegetable oil having at least one degree of unsaturation and a fire point above 300° C., wherein the vegetable oil has a viscosity of between 2 and 15 cSt at 100° C., and less than 110 cSt at 40° C.

20. The method of claim 19 in which the vegetable oil is a flowable liquid at temperatures lower than −20° C.

21. The method of claim 19 in which the vegetable oil comprises a blend of two or more vegetable oils wherein the dielectric fluid has a lower pour point than the two or more oils.

22. The method of claim 19, further comprising an oxygen scavenging material in contact with the dielectric fluid.

23. The method of claim 22, wherein the oxygen scavenging material is dissolved in the dielectric fluid.

24. A transformer including a tank housing a transformer core/coil assembly, comprising:

a dielectric insulating fluid surrounding said core/coil assembly, wherein said dielectric fluid is essentially a natural food product and consists essentially of a vegetable oil, wherein the vegetable oil has a viscosity of between 2 and 15 cSt at 100° C., and less than 110 cSt at 40° C.; and means for reducing exposure of the vegetable oil to oxygen.

25. The transformer according to claim 24, said exposure reducing means comprising an oxygen scavenging chemical in said oil.

26. The transformer according to claim 24, said exposure reducing means comprising an oxygen absorbing material contained in said tank and in contact with gases in said tank but isolated from contact with said dielectric fluid.

27. A method of using a transformer comprising the step of employing in the transformer a dielectric fluid, wherein the dielectric fluid is essentially a natural food product and consists essentially of a vegetable oil having at least one degree of unsaturation and fire point above 300° C., wherein the vegetable oil has a viscosity of between 2 and 15 cSt at 100° C., and less than 110 cSt at 40° C.

* * * * *